US 6,724,370 B2

(12) United States Patent
Dutta et al.

(10) Patent No.: US 6,724,370 B2
(45) Date of Patent: Apr. 20, 2004

(54) TOUCHSCREEN USER INTERFACE (75) Inventors: Rabindranath Dutta, Austin, TX (US); Robert J. Kamper, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 09/833,341

(22) Filed: Apr. 12, 2001

(65) Prior Publication Data

US 2002/0149569 A1 Oct. 17, 2002

(51) Int. Cl.$^7$ ................................................ G09G 5/00
(52) U.S. Cl. ........................ 345/169; 345/173; 341/22
(58) Field of Search ........................ 345/168, 169, 345/171, 172, 173–178; 178/18.01, 18.03, 19.01; 341/22, 28, 34, 23

(56) References Cited

U.S. PATENT DOCUMENTS

| 4,725,694 | A | * | 2/1988 | Auer et al. |
| 5,128,672 | A | * | 7/1992 | Kaehler |
| 5,574,482 | A | * | 11/1996 | Niemeier |
| 5,748,512 | A | * | 5/1998 | Vargas |
| 5,784,060 | A | * | 7/1998 | Bertram et al. |
| 5,818,437 | A | * | 10/1998 | Grover |
| 6,169,538 | B1 | * | 1/2001 | Nowlan et al. |
| 6,271,835 | B1 | * | 8/2001 | Hoeksma |

FOREIGN PATENT DOCUMENTS

| JP | 405094253 | * | 4/1993 | |
| JP | 08-221169 | | 8/1996 | ............ G06F/3/02 |
| JP | 09-160910 | | 6/1997 | ........... G06F/17/22 |
| JP | 10-154033 | | 6/1998 | ............ G06F/3/03 |
| JP | 10-161793 | | 6/1998 | ........... G06F/3/023 |
| JP | 10-301692 | | 11/1998 | ........... G06F/3/023 |
| JP | 11-272386 | | 10/1999 | ............ G06F/3/00 |

* cited by examiner

Primary Examiner—Regina Liang
(74) Attorney, Agent, or Firm—Duke W. Yee; Marilyn Smith Dawkins; Wayne P. Bailey (57) ABSTRACT A customizable touchscreen keyboard, and method, system, and computer program product for customizing the touchscreen keyboard is provided. In one embodiment, a data processing system receives customization characteristics from a user through the touchscreen interface. The data processing system then creates a customized touchscreen keyboard layout based on the customization characteristics and presents the customized touchscreen keyboard layout to a user. For example, the user may customize the keyboard such that the letters are presented in a U-shape with the letters arranged in alphabetical order, thus aiding a user in finding a desired letter. The user may later recustomize the keyboard if desired. Furthermore, the data processing system may reconfigure the keyboard based on past usage by the user.

5 Claims, 8 Drawing Sheets

TOUCHSCREEN USER INTERFACE

BACKGROUND OF THE INVENTION

1. Technical Field

The present invention relates to an improved touchscreen keyboard for use with a data processing system.

2. Description of Related Art

Computers over the last quarter century have infiltrated almost every aspect of modern life. Computers are used by large corporations and universities to perform very complex functions as well as by individuals in their homes to manage personal business or for personal enjoyment. As circuits have become smaller and cheaper, computers have become smaller and have begun to be used for more mundane tasks such as managing a personal calendar or contact list on a portable device such as a personal digital assistant or digital wireless telephone.

A Personal Digital Assistant (PDA) is a handheld computer that serves as an organizer for personal information. It generally includes at least a name and address database, to-do list and note taker. PDAs are pen based and use a stylus to tap selections on menus and to enter printed characters. The unit may also include a small on-screen keyboard which is tapped with the pen. Data is synchronized between the PDA and desktop computer via cable or wireless transmission.

A PDA is like a palmtop computer except that the PDA typically uses a pen whereas the palmtop uses a small keyboard. Apple's MessagePad, more commonly known as the "Newton," was the first to popularize the concept.

However, devices such as PDAs have limited data input options because of their size. As discussed above, many of these devices utilize touchscreen keyboards with data entries selected with a stylus by touching the screen over the desired character. The power and speed of small devices such as PDAs is increasing rapidly. Thus, the range of functions that may conceivably be performed by such devices is approaching that of personal computers. The limitations on speed and ease of data entry inhibit users from actually using their PDAs in any manner more complex than calendar or contact management. It would be desirable therefore, to have an improved touchscreen keyboard that facilitated greater speed and ease in user input.

SUMMARY OF THE INVENTION

The present invention provides a customizable touchscreen keyboard, and method, system, and computer program product for customizing the touchscreen keyboard. In one embodiment, a data processing system receives customization characteristics from a user through the touchscreen interface. The data processing system then creates a customized touchscreen keyboard layout based on the customization characteristics and presents the customized touchscreen keyboard layout to a user. For example, the user may customize the keyboard such that the letters are presented in a U-shape with the letters arranged in alphabetical order, thus aiding a user in finding a desired letter. The user may later recustomize the keyboard if desired. Furthermore, the data processing system may reconfigure the keyboard based on past usage by the user.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
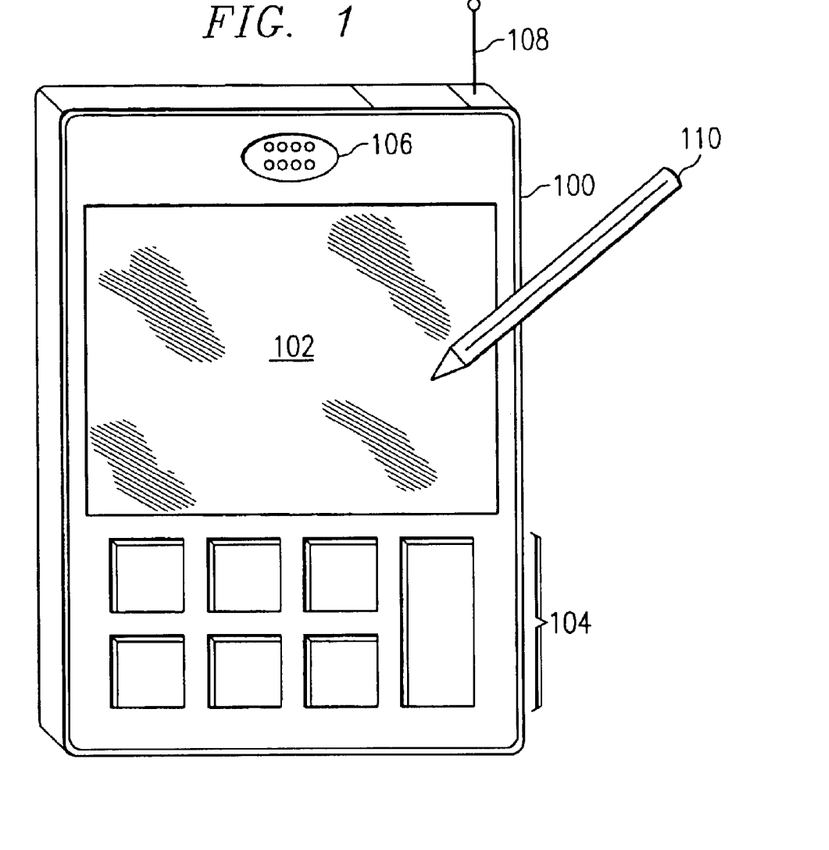
FIG. 1 depicts a diagram of a personal digital assistant (PDA) in accordance with a preferred embodiment of the present invention.

With reference now to the figures and, in particular, with reference to FIG. 1, a diagram of a personal digital assistant (PDA) is depicted in accordance with a preferred embodiment of the present invention. PDA 100 includes a display 102 for presenting textual and graphical information. Display 102 may be a known display device, such as a liquid crystal display (LCD) device. The display may be used to present a map or directions, calendar information, a telephone directory, an electronic mail message, or any other data. In these examples, screen 102 may receive user input using an input device such as, for example, stylus 110.

PDA 100 may also include keypad 104, speaker 106, and antenna 108. Keypad 104 may be used to receive user input in addition to using screen 102. Speaker 106 provides a mechanism for audio output, such as presentation of an audio file. Antenna 108 provides a mechanism used in establishing a wireless communications link between PDA 100 and a network, such as network 202 in FIG. 2.

PDA 100 also preferably includes a graphical user interface that may be implemented by means of systems software residing in computer readable media in operation within PDA 100.

Figure 2:
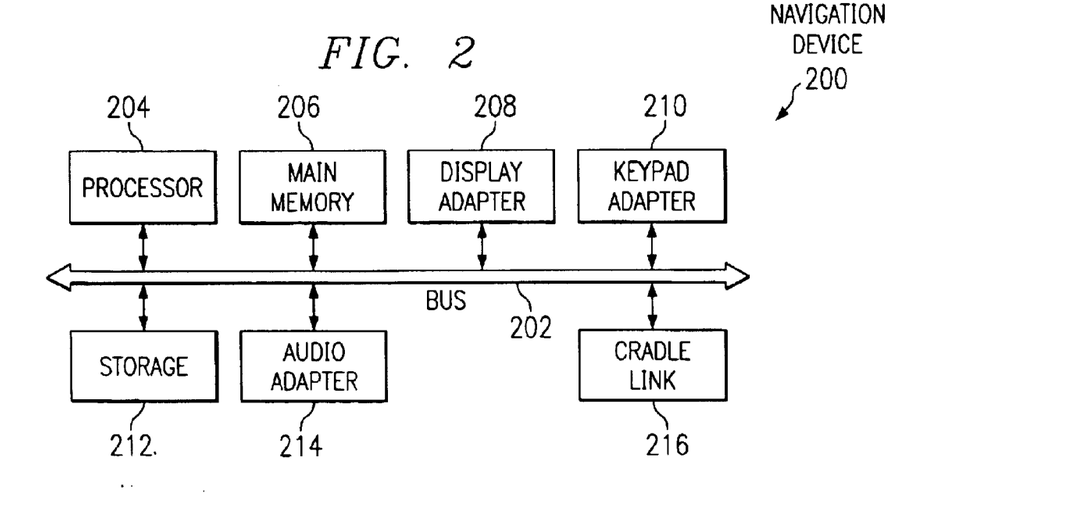
FIG. 2 depicts a block diagram of a PDA in accordance with a preferred embodiment of the present invention.

Turning now to FIG. 2, a block diagram of a PDA is shown in accordance with a preferred embodiment of the present invention. PDA 200 is an example of a PDA, such as PDA 100 in FIG. 1, in which code or instructions implementing the processes of the present invention may be located. PDA 200 includes a bus 202 to which processor 204 and main memory 206 are connected. Display adapter 208, keypad adapter 210, storage 212, and audio adapter 214 also are connected to bus 202. Cradle link 216 provides a mechanism to connect PDA 200 to a cradle used in synchronizing data in PDA 200 with another data processing system. Further, display adapter 208 also includes a mechanism to receive user input from a stylus when a touchscreen display is employed.

An operating system runs on processor 204 and is used to coordinate and provide control of various components within PDA 200 in FIG. 2. The operating system may be, for example, a commercially available operating system such as Windows CE, which is available from Microsoft Corporation. Instructions for the operating system and applications or programs are located on storage devices, such as storage 212, and may be loaded into main memory 206 for execution by processor 204.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2.

Figure 3:
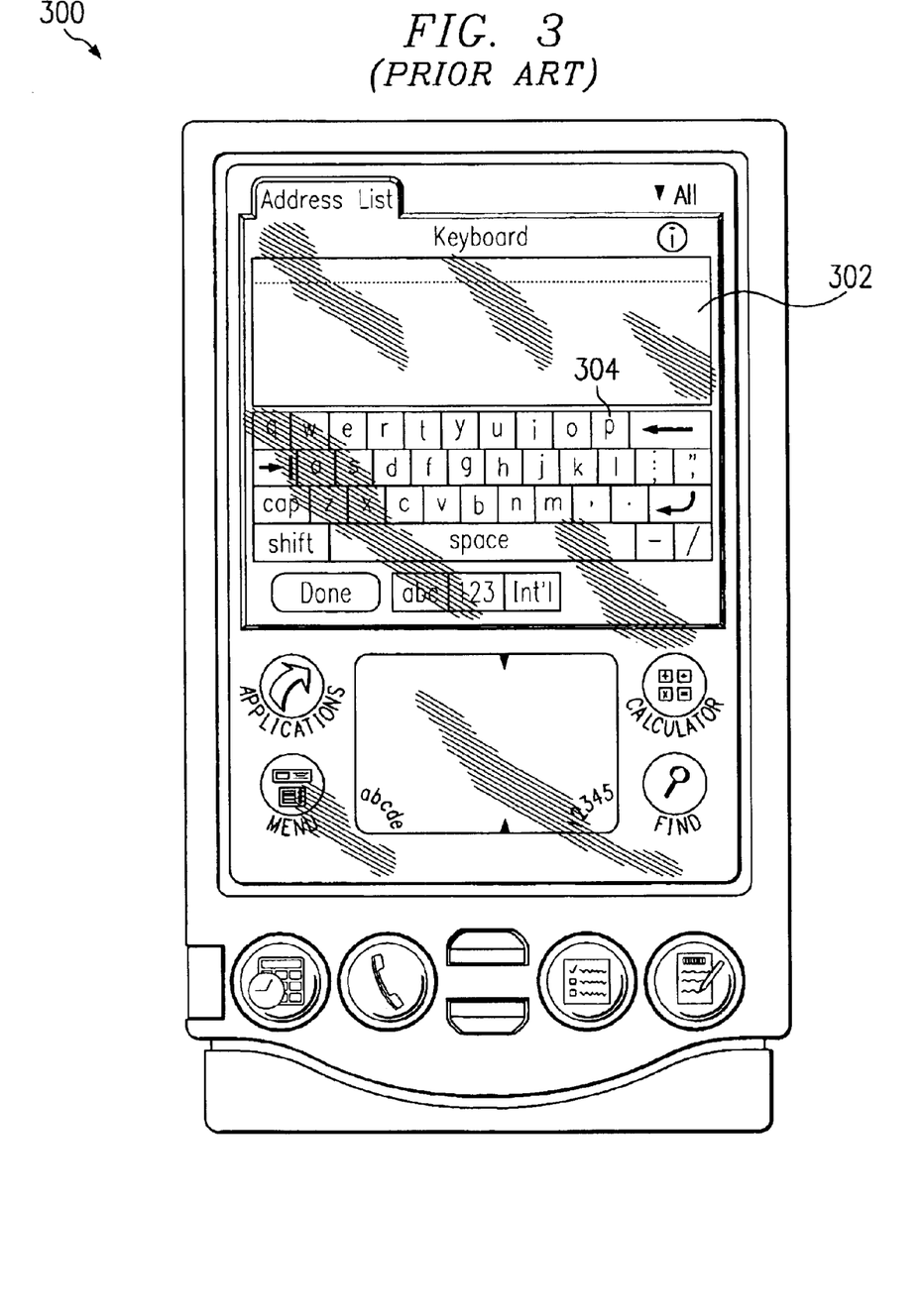
FIG. 3 depicts a pictorial diagram illustrating a touchscreen keyboard for use in a PDA in accordance with the prior art.

With reference now to FIG. 3, a pictorial diagram illustrating a touchscreen keyboard for use in a PDA in accordance with the prior art is shown. PDA 300 includes a display 302 and a touchscreen keyboard 304. Characters are entered by using a stylus (not shown) to select characters from the touchscreen keyboard 304. However, one problem with the current system is that data entry is very time consuming since a user is required to use a stylus and search and pick letters one at a time. This entry method is much slower than typing at a conventional keyboard. However, a conventional keyboard is not a realistic option for PDAs since the size of the keyboard necessary to fit into the confined space of a PDA is too small for the size of a typical person's hand to use efficiently.

Figure 4:
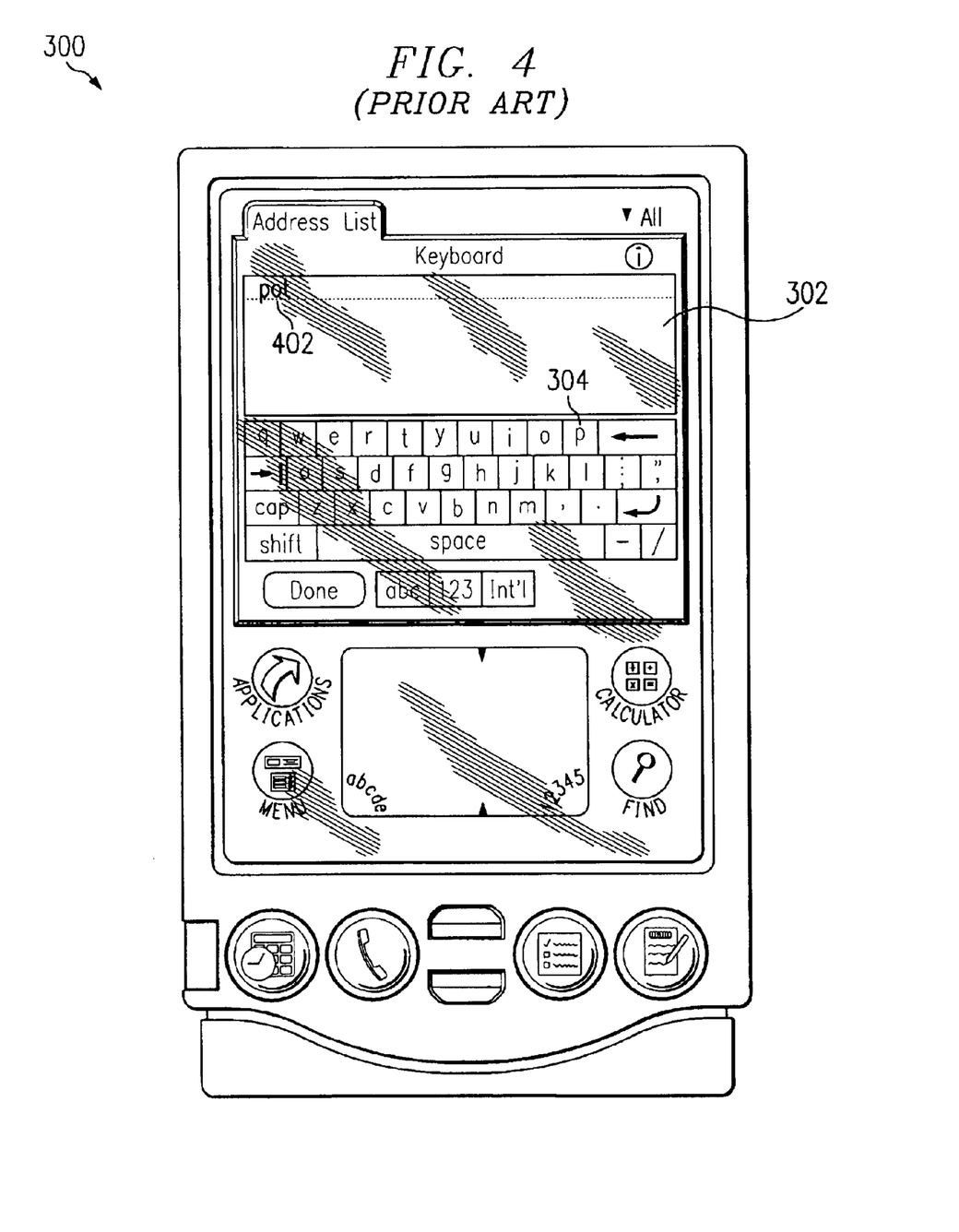
FIG. 4 depicts a pictorial diagram of the PDA in FIG. 3 after the entry of a few characters.

With reference now to FIG. 4, a pictorial diagram of the PDA in FIG. 3 is depicted after the entry of a few characters. The letters "pat" 402 have been entered into PDA 300. With the conventional prior art touchscreen keyboard, the user would have to continue to search and peck with a stylus to complete the word or phrase desired to be entered. A new touchscreen keyboard providing a quicker entry method is desirable and provided by the present invention.

Figure 5:
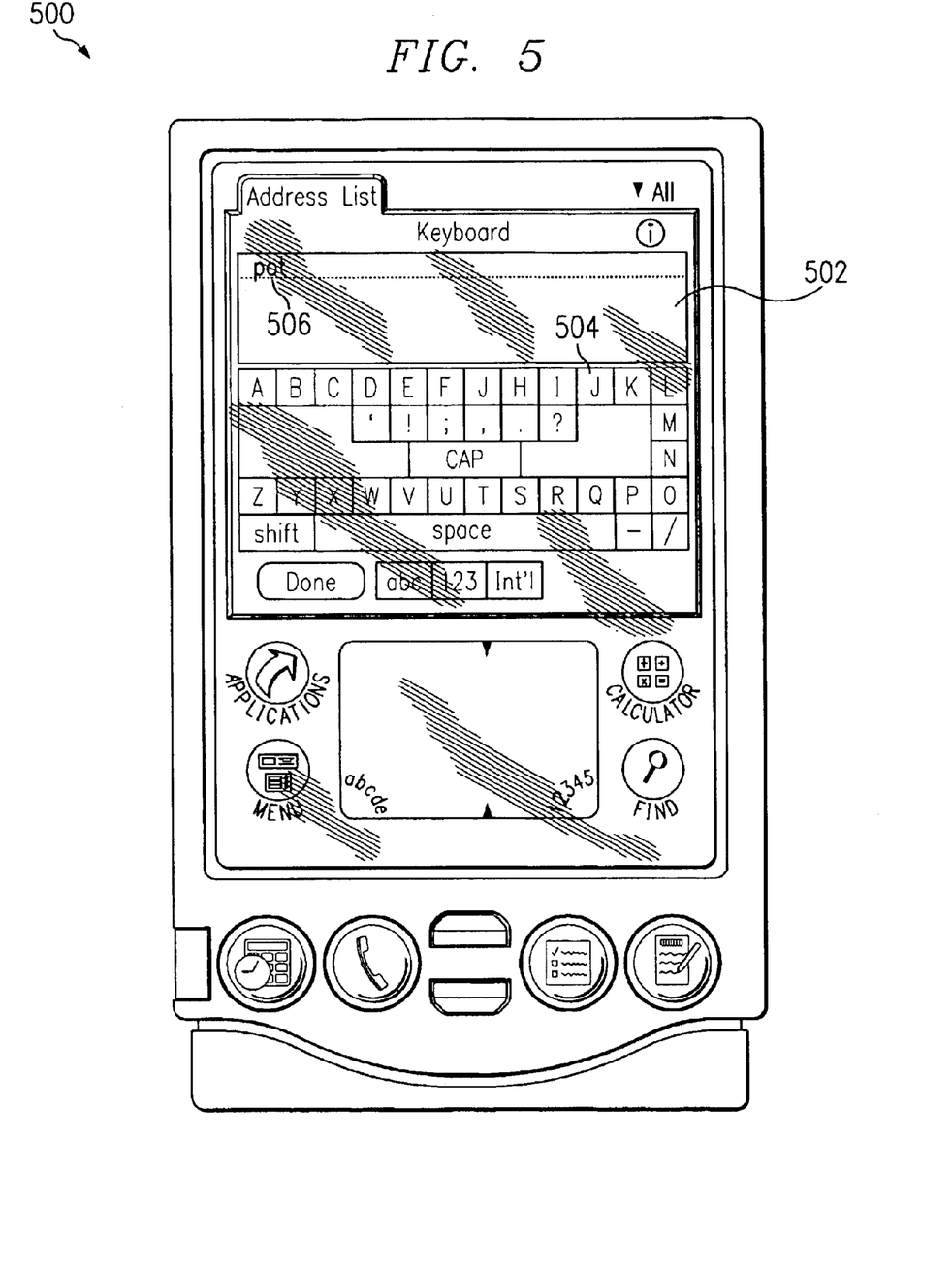
FIG. 5 depicts a pictorial diagram of a PDA illustrating a customizable keyboard in accordance with the present invention.

With reference now to FIG. 5, a pictorial diagram of a PDA illustrating a customizable keyboard is depicted in accordance with the present invention. PDA 500 may be implemented as, for example, PDA 200 in FIG. 2 and includes a display 502, a customizable keyboard 504, and a data entry area 506. In this embodiment, in order to facilitate user input, the user may customize the keyboard 504 in a fashion that facilitates input into PDA 500. In the depicted example, keyboard 504 has been dynamically customized by the user to present the letters in a "U"-shaped format with other characters and function keys presented in the middle or below. In the depicted example, the letters are arranged in alphabetical sequence around the "U"-shaped keyboard. However, other arrangements of letters are possible, such as arranging the letters according to their frequency of use in the chosen language. Furthermore, although the letters are arranged in a clock wise fashion, the letters may be arranged in a counter clock wise fashion as selected by a user. Thus, right handed and left handed users may select a direction that is most suitable for their use.

Figure 10:
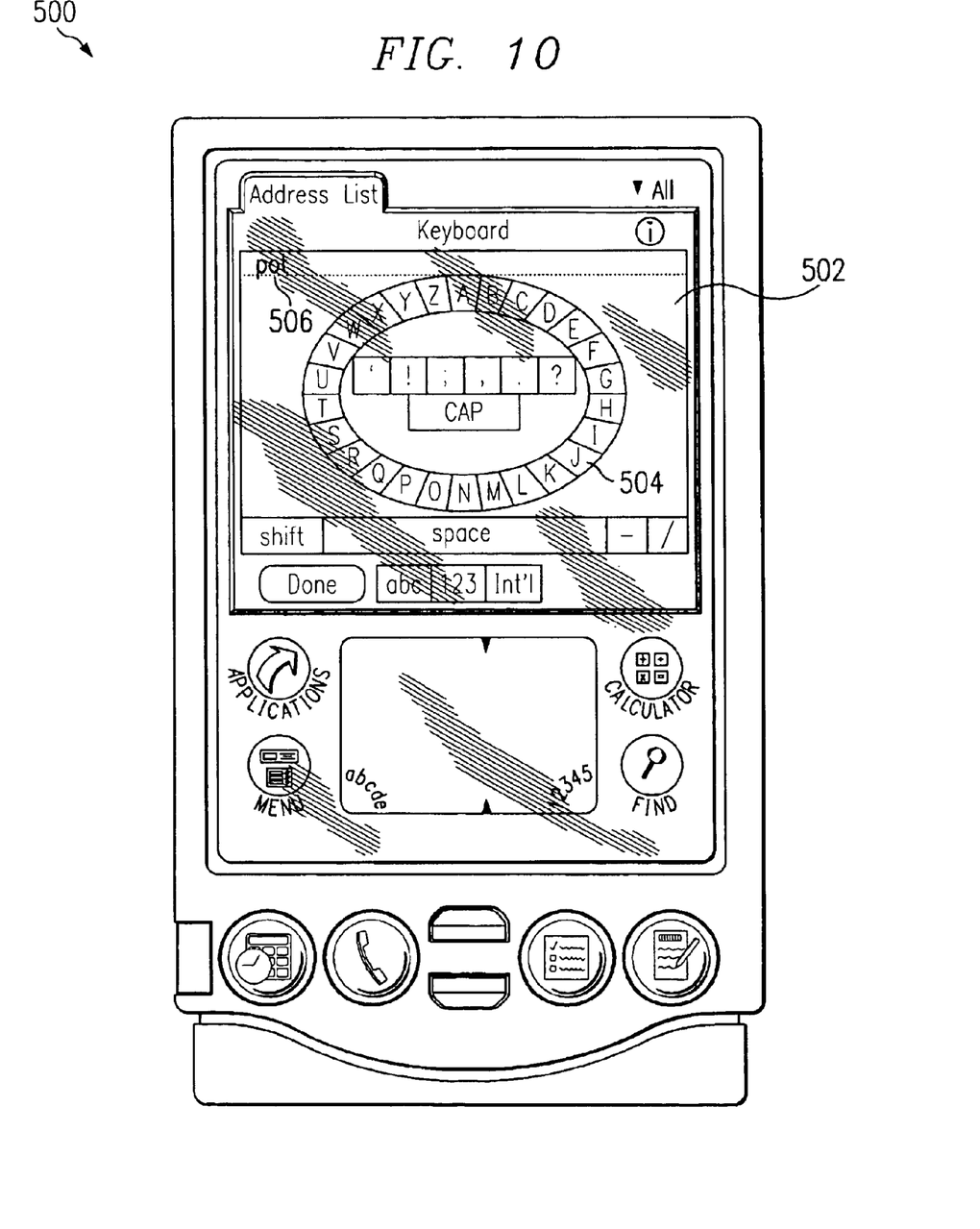
FIG. 10 depicts a pictorial diagram of a PDA illustrating a customizable keyboard comprising a plurality of letter keys in a substantially circular arrangement.

By presenting the letters in a "U"-shaped pattern, the user, particularly users not familiar with the placement of keys on a standard keyboard, may more easily locate the letters desired for entry. Furthermore, by arranging the letters in a "U"-shape as shown in FIG. 5) or circular shape (as shown in FIG. 10) the user can use a circular motion with the user's hand in selecting the appropriate letters using a stylus. Such a motion may be more convenient to some users since it does not require as much altering directions of movement as some other arrangements might require.

In other embodiments, the user might specifically choose the placement of each letter, in for example, a conventional keyboard layout or choose the order of letters in some shape, such as the depicted "U"-shape. For example, the letters may be initially displayed perhaps at the bottom of display 502 and the user use a stylus or other entry method to drag and drop the keys in an arrangement desired by the user. Also, the customization of the keyboard may be performed an indefinite number of times as desired by the user. Thus, the user could customize the keyboard to a desired arrangement that the user desires for one type of data entry and then recustomize the keyboard to a different arrangement that the user believes more desirable for a different type of data entry. Furthermore, different users could use the same device and each customize the keyboard differently for their own desires and needs.

In other embodiments, the user could emphasize certain keys, such as all the vowel keys, by, for example, enlarging the size of the certain keys, changing the shape of certain keys, changing the color of certain keys, changing the font size or style of certain keys, or animating certain keys. Thus, for example, the user could choose to animate all the vowels as they are used more frequently. The user could also make the keys for the numbers bigger if numbers are used often by the user.

Furthermore, rather than merely providing the user with means to rearrange the keyboard in a manner suitable for the user, in other embodiments, the customizable keyboard includes functionality which provides the user with hints as to which keyboard characters are used most or that might be used next, such as described in further detail below. Furthermore, in other embodiments, the keyboard may be periodically reconfigured depending upon, for example, frequent typing errors of the user or upon the keys that the user actually types more often. Thus, the reconfigurable keyboard may be reconfigured to enlarge or emphasize keys that are more often typed. Or, in other embodiments, frequently mistyped keys may be enlarged or emphasized, thus reducing the number of misspelled words typed by the user.

In other examples, the user may wish to resize the keyboard layout to accommodate the hand motion and target acquisition dexterity of the user. For example, older and younger users with lower levels of fine motor control may choose or be provided with a larger keyboard while users with higher levels of fine motor control may choose a smaller layout that reduces total motion distance but requires a more accurate "hit" of the target letter area.

Additionally, the customizable keyboard 504 may be used in conjunction with entry prediction technology as described in more detail below to aid further in the entry of data by a user.

Figures 6, 9:
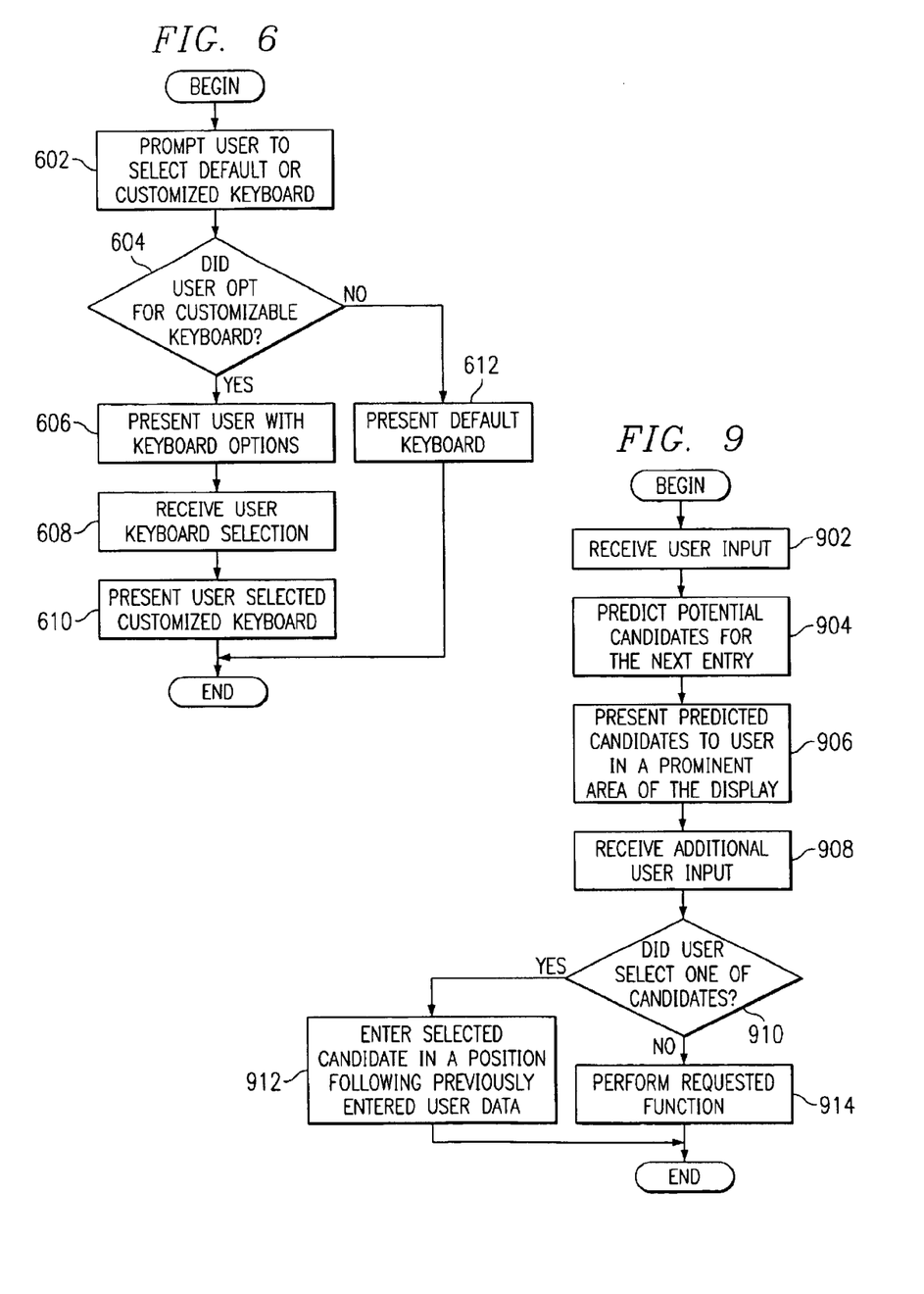
FIG. 6 depicts a process flow and program function for customizing keyboard presentation for a customizable touchscreen keyboard in accordance with the present invention.
FIG. 9 depicts a process flow and program function for identifying predicted characters and presenting predicted characters to a user in accordance with the present invention.

With reference now to FIG. 6, a process flow and program function for customizing keyboard presentation for a customizable touchscreen keyboard is depicted in accordance with the present invention. To begin, the PDA may prompt the user to select either a default or customized keyboard (step 602). The default keyboard may be, for example, a keyboard with an appearance similar to a standard keyboard as may be used on typewriters. The PDA then determines whether the user opted for a customizable keyboard or a default keyboard (step 604). If the user opted for the default keyboard, then the PDA presents the user the default keyboard on the PDA display (step 612).

If the user opted for the customizable keyboard, then the PDA presents the user with keyboard customization options (step 606). The customization options may merely be a selection of several predetermined keyboard formats or may allow the user to choose from a number of options in creating a customized keyboard. Such other options may include selecting a shape, size of the "keys" and arrangement of the keys on the chosen shape. Once the PDA receives a customization selection from the user (step 608), the PDA presents the customized keyboard layout to the user (step 610) and awaits user input.

Figure 7:
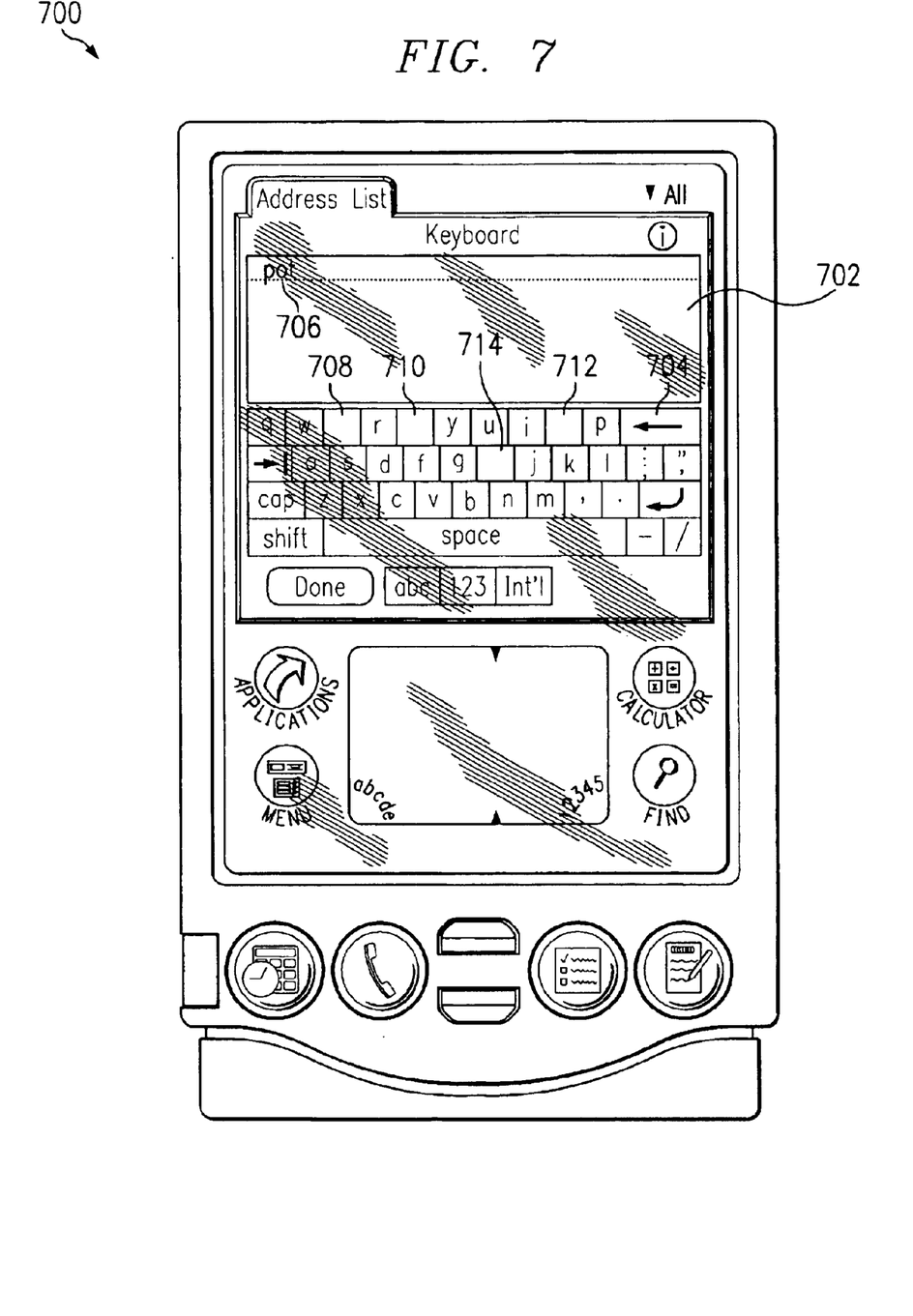
FIG. 7 depicts a pictorial diagram of a PDA with an improved touchscreen keyboard with predictive technology in accordance with one embodiment of the present invention.

With reference now to FIG. 7, a pictorial diagram of a PDA with an improved touchscreen keyboard with predictive technology is depicted in accordance with one embodiment of the present invention. PDA 700 may be implemented as PDA 200 in FIG. 2 and includes an improved customizable touchscreen keyboard with word or letter prediction technology. PDA 700 is similar to PDA 300 in FIG. 3. PDA 700 includes a display 702 and touchscreen keyboard 704 with entry area 706. However, unlike prior art touchscreen keyboards, after a user has entered a one or more characters, the PDA 700 determines which letter or letters are likely to be entered next and highlights these letters or characters 708–714.

Thus, in the present example, the user has entered the letters "pat" into entry area 706. Based on this, PDA 700 emphasizes letters "e" 708, "t" 710, "o" 712, and "h" 714. These letters may be chosen by reference to a library of words, identifying words that start with the letters previously entered by the user, and highlighting the letter or letters that would be needed next to complete each of the identified words. The PDA could identify all possible words and highlight the letters needed for each word. Alternatively, the PDA could identify a subset of all possible words, where the words chosen to have highlighted letters necessary to complete the words are words that the PDA has identified as words that have a higher probability of use. This probability may be based on the likelihood of occurrence in the language, such as, for example, English, generally, or may be based on the learned likelihood of occurrence based on the particular user's use of particular words. Thus, a word that may be very common in ordinary English use may be less common for a particular user and therefore, the letter necessary to complete the word not presented to this particular user.

The method of emphasizing the letters may include, for example, increasing the font size of the emphasized letters, highlighting the emphasized letters as depicted in FIG. 7, changing the color of the emphasized letters, or animating the emphasized letters, such as, for example, by having the emphasized letters blink. Other methods of emphasizing the selected letters may be used as well. For example, the emphasized letters may be moved or copied to a position of more prominence on the display 702, such as, near or below the entry area 706. By identifying potential letters that the user may wish to enter next, the user's eye is drawn to those letters enabling the user to select the next letter more readily than if the user needed to look across every letter on the keyboard to locate the next letter for entry.

In the depicted example, the user has selected a default "normal" keyboard. However, the predictive technology is applicable to other choices of customized keyboards as well such as discussed above.

Figure 8:
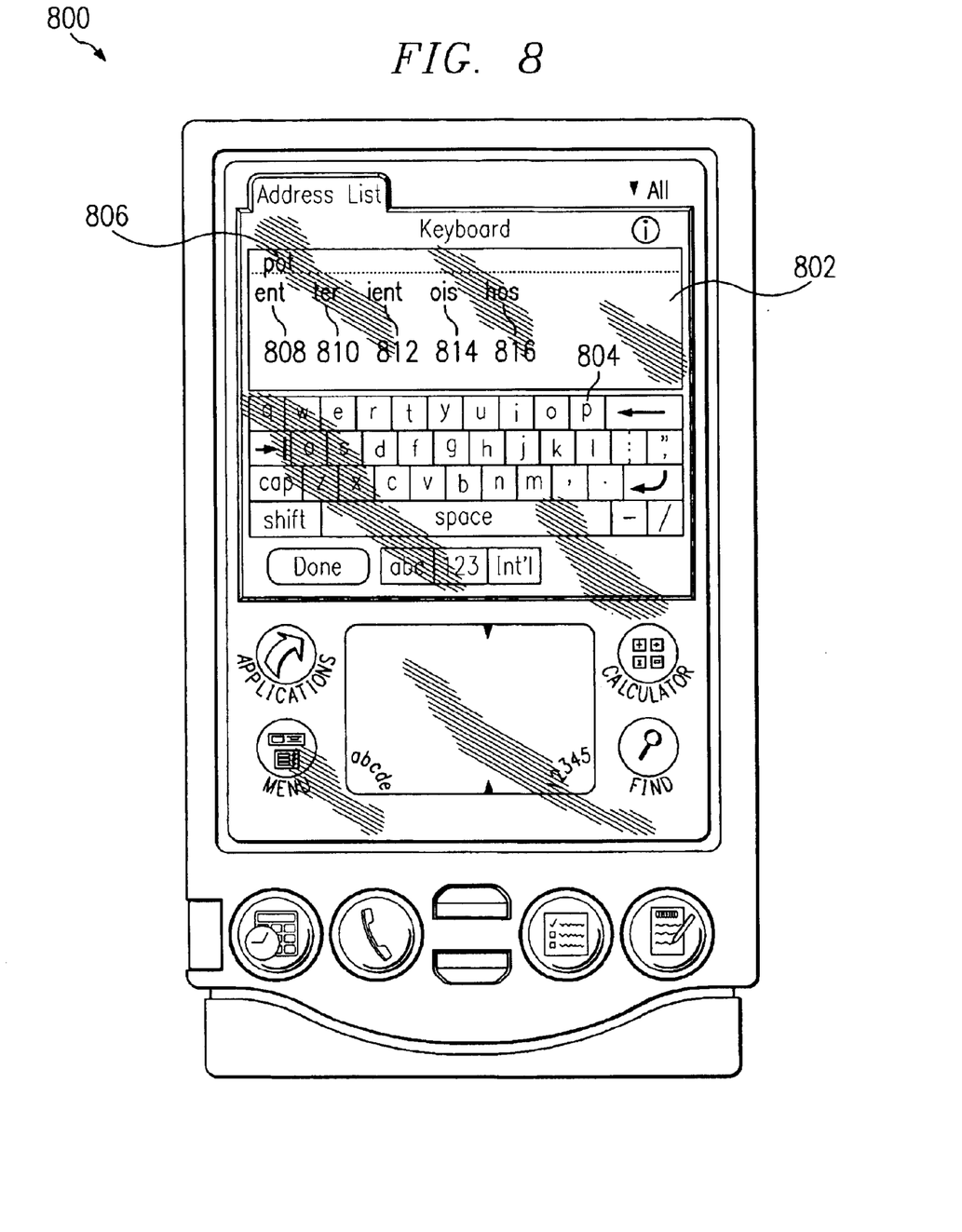
FIG. 8 depicts a pictorial diagram illustrating another embodiment of an improved customizable touchscreen keyboard with predictive technology according to the present invention.

With reference now to FIG. 8, a pictorial diagram illustrating another embodiment of an improved customizable touchscreen keyboard with predictive technology is depicted according to the present invention. Again, as with PDA 700, PDA 800 may be implemented as, for example, PDA 200 in FIG. 2. PDA 800 includes a display 802, a touchscreen keyboard 804, and entry area 806. However, in this embodiment, rather than identifying potential candidates for the next letter or character to be entered by the user and emphasizing those letters or characters, words starting with the characters that the user has entered into display area 806 are identified and the endings 808–816 necessary to form these words are presented to the user in a conspicuous area of display 802. Again, these endings 808–816 may be the endings of every word identified by PDA 800 as potential candidates or the endings 808–816 may only be those endings that PDA 800 has identified as being the endings of the most probable words. The identity of words as being a more or most probable word may be performed based on their frequency of occurrence in the language, such as, for example, English, French, or Spanish, utilized by the PDA display or, alternatively, may be the words identified by the PDA 800 as the most common words used by the particular user based on past usage.

In the depicted example, the user has entered the letters "pat" into entry area 806. PDA 800 has identified five potential candidates for the word that the user wishes to enter. These candidate words are "patent," "patter," "patient," "patios", and "pathos." Thus, the suggested endings of "ent" 808, "ter" 810, "ient" 812, "ois" 814, and "hos" 816 are presented to the user. The user may select one of these suggestions, for example, by tapping or double tapping the display 802 over the area of the desired ending 808–816. However, if none of these endings forms the word desired by the user, the user may use the keyboard 804 to continue entering characters until the desired word, phrase, or character string is entered.

By presenting potential word endings to the user in a prominent place on display 802, the user may finish entering a word or phrase more quickly since the remaining letters of the word or phrase do not need to be entered individually. Thus, the data entry apparatus provided by PDA 800 allows a user to enter data more quickly than with prior art keyboards.

Additionally, PDA 800 may be modified such that rather than presenting predicted word ending options to the user to complete the word, PDA 800 may present predicted letters that may be entered after the last letter displayed in the entry area 806 or may present predicted phonemes or syllables that the user may wish to place next in the entry area 806. (A phoneme is any of the abstract units of the phonetic system of a language that correspond to a set of similar speech sounds which are perceived to be a single distinctive sound in the language.) Alternatively, the PDA 800 may present several of the above possibilities to the user. For example, PDA 800 may present both predicted word endings and predicted next letters to the user, perhaps on different lines of display 802. Thus, the user would be presented with the option of completing the word with one of the optional endings or using one of the predicted letters that are presented in a more prominent area of display 802 than are the rest of the letters of the alphabet, thus allowing the user to more quickly locate these letters. Although it is possible to present the user with an almost unlimited range of possibilities, it is desirable to limit the amount of predicted endings, letters, syllables, or phonemes to some rather small number smaller at least than the number of characters in the alphabet, otherwise the user will again face the problem of searching a rather large range of possibilities for the desired entry.

An additional alternative provides a temporary display of the letter of group of letters pointed to after a single tap, and entering the input on a double or second tap of the stylus. Thus, for example, the display may, after a stylus tap of the letter "e", display the following with an "e" placed in the fourth letter place of the word as shown below:

pate__ e/tioh

Then after a stylus tap of "t", the "e" in the fourth letter place is replaced with a "t" as the following depicts:

patt__ et/ioh

The "/" represents single stylus tap, and after each tap, the preceding letter is replaced by the current letter tapped. After a second tap on a letter enters the letter "semi-permanently" and moves the input point to the right one space. Thus, the display, after double clicking the letter "e" would show the following:

pate__ __ __ e/tioh

Thus, the second tap on the letter "e" enters it "semi-permanently" and moves the input point to the right one space. The term "semi-permanently" is used to indicate that a back arrow or delete key may be used to delete a letter inadvertently double clicked and entered into the field.

The same approach may be extended to groups of letters which would be entered temporarily or "semi-permanently" on one or two taps, respectively.

With reference now to FIG. 9, a process flow and program function for identifying predicted characters and presenting predicted characters to a user is depicted in accordance with the present invention. To begin, the PDA receives user input (step 902). Based on the received user input, the PDA predicts potential candidates for the next entry (step 904). The predicted candidates could be, for example, predictions of the next letter or the remaining letters needed to form a word. The prediction could also be based on probability of occurrence either based on the frequency of occurrence in the language or on the frequency that the particular user has used the words in the past.

Once the predicted candidates have been identified, the PDA presents the predicted candidates to the user in a prominent fashion (step 906). The presentation could be, for example, emphasizing certain letters on the keyboard, or presenting predicted letters or endings in a prominent area of the display. The PDA then receives further user input (step 908) and determines whether the user has selected one of the predicted candidates or some other option (step 910). If some other option has been selected, then the PDA performs the requested function, such as, for example, merely entering a character as selected from the main keyboard that was not one of the predicted candidates. If the user did select one of the predicted candidates, the PDA enters the selected candidate in a position following the previously entered user data (step 912).

Although the present invention has been described in primarily in terms of a personal digital assistant, it will be apparent to one skilled in the art, the present invention may be applied to other types of touchscreen displays as well, whether or not such touchscreens are presented on a PDA or some other type of data processing system. For example, the present invention could be implemented on a wireless phone having a touchscreen interface.

Furthermore, it is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of customizing a touchscreen keyboard, the method comprising:

receiving customization characteristics;

creating a customized touchscreen keyboard layout from the customization characteristics;

presenting the customized touchscreen keyboard layout to a user;

generating a reconfigured keyboard in response to a peculiar habit of a user; and presenting the reconfigured keyboard to the user, wherein the peculiar habit of the user is frequent mistyped words and the reconfigured keyboard is arranged to emphasize frequently mistyped symbols.

2. The method as recited in claim 1, wherein letters of the reconfigured keyboard are arranged in a U-shape, and in alphabetical order in a clockwise direction around the U-shape.

3. The method as recited in claim 1, wherein letters of the reconfigured keyboard are arranged in a U-shape, and in alphabetical order in a counterclockwise direction around the U-shape.

4. The data processing system as recited in claim 1, wherein letter keys of the reconfigured keyboard are arranged alphabetically.

5. The data processing system as recited in claim 1, wherein the letter keys of the reconfigured keyboard are dynamically arranged according to frequency of actual use by the user.

* * * * *

UNITED STATES PATENT AND TRADEMARK OFFICE
CERTIFICATE OF CORRECTION

PATENT NO. : 6,724,370 B2
DATED : April 20, 2004
INVENTOR(S) : Dutta et al.

It is certified that error appears in the above-identified patent and that said Letters Patent is hereby corrected as shown below:

<u>Column 4,</u>
Line 52, insert the following paragraph:
-- Also, in other embodiments, appropriate distinguishing sounds could be generated by the PDA 500 when a key is typed. For example, when "a" is typed, "a" could be spoken by a speech synthesizer within PDA 500. This would help people who frequently mistype or cannot see the keyboard well. --.

Signed and Sealed this

Thirteenth Day of December, 2005

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 6,724,370 B2 |
| APPLICATION NO. | : 09/833341 |
| DATED | : April 20, 2004 |
| INVENTOR(S) | : Dutta et al. |

Page 1 of 1

It is certified that error appears in the above-identified patent and that said Letters Patent is hereby corrected as shown below:

Col. 4, line 52: insert the following paragraph:
--Furthermore, rather than merely providing the user with means to rearrange the keyboard in a manner suitable for the user, in other embodiments, the customizable keyboard includes functionality which provides the user with hints as to which keyboard characters are used most or that might be used next, such as described in further detail below. Furthermore, in other embodiments, the keyboard may be periodically reconfigured depending upon, for example, frequent typing errors of the user or upon the keys that the user actually types more often. Thus, the reconfigurable keyboard may be reconfigured to enlarge or emphasize keys that are more often types. Or, in other embodiments, frequently mistyped keys may be enlarged or emphasized, thus reducing the number of misspelled words typed by the user.--

Col. 8, line 54: after "The" delete "data processing system" and insert --method--.

Col. 8, line 57: after "The" delete "data processing system" and insert --method--.

Signed and Sealed this

Second Day of January, 2007

JON W. DUDAS
*Director of the United States Patent and Trademark Office*